(Model.)
C. O. HAMMER.
BOTTLE STOPPER.
No. 251,223. Patented Dec. 20, 1881.
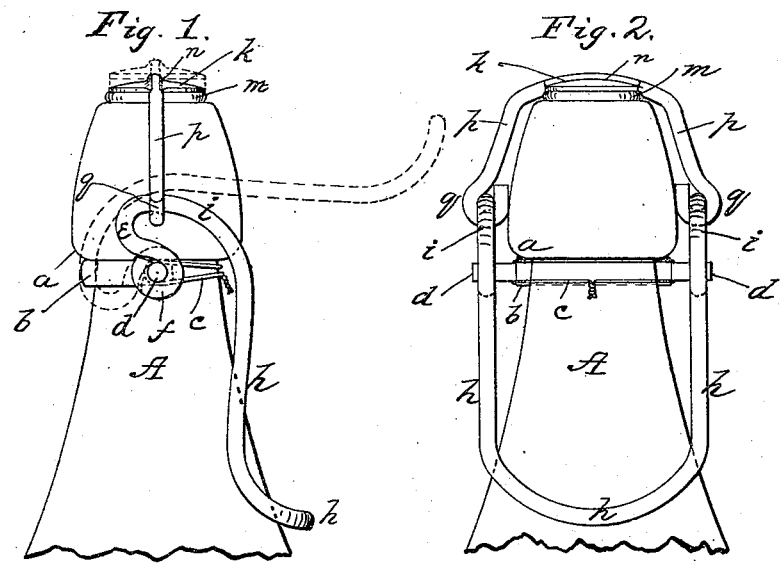
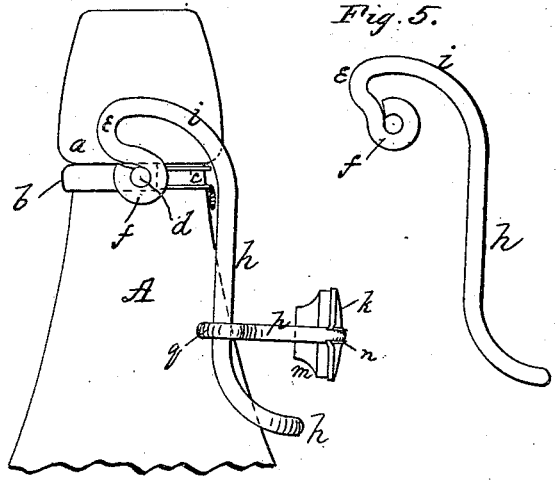
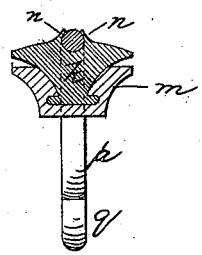
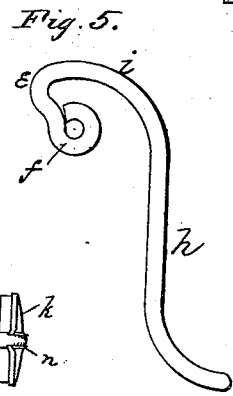
WITNESSES:
Thomas Honnen
P. J. Patterson
C. Otto Hammer, INVENTOR
Connolly Bros & McTighe
ATTORNEYS

UNITED STATES PATENT OFFICE.

C. OTTO HAMMER, OF PITTSBURG, PENNSYLVANIA, ASSIGNOR OF ONE-HALF TO JOHN H. BARR, OF SAME PLACE.

BOTTLE-STOPPER.

SPECIFICATION forming part of Letters Patent No. 251,223, dated December 20, 1881.

Application filed July 11, 1881. (Model.)

*To all whom it may concern:*

Be it known that I, C. OTTO HAMMER, of Pittsburg, in the county of Allegheny and State of Pennsylvania, have invented certain new and useful Improvements in Bottle-Stoppers; and I do hereby declare that the following is a full, clear, and exact description of the invention, which will enable others skilled in the art to which it appertains to make and use the same, reference being had to the accompanying drawings, which form a part of this specification, in which—

Figure 1 is a side elevation of a bottle-top provided with my improvement in closed position. Fig. 2 is a front elevation of the same. Fig. 3 is a side elevation, showing bottle open. Fig. 4 is a section through bail and stopper. Fig. 5 is a modification of the lever.

My invention has for its object the production of a cheap, durable, and efficient bottle-stopper in as simple a manner and form as possible.

The invention consists in attaching to the bottle-neck a neckband having projections or suitable pivot-points, and pivoting thereon or therein a wire lever, which passes through eyes made on the bail, which is drawn down or pushed up by the movement of the said lever, and moves the stopper which is attached rigidly to the bail, substantially as hereinafter described and claimed.

A designates the bottle, having the usual shoulder, $a$. Around the neck, under the shoulder $a$, I fasten the semicircular neckband $b$ by the wire $c$, as shown. On neckband $b$ are two diametrically-opposite lugs or pivots, $d$.

The lever $h$ consists of a piece of strong wire bent to U shape to embrace the bottle-neck, and having its ends bent reversely at $e$, and forming at the ends the eyes $f$, which slip over and turn in a vertical plane upon the lugs $d$. The lever $h$ is bent at $i$ into a circle eccentric to the center of motion at $d$.

A metallic button, $k$, carries the elastic stopper $m$, and has a groove across its top, with flanges $n$ at the edges projecting upwardly, and the top of button $k$ is preferably convex, with the said groove following the curvature. The bail $p$ is correspondingly bent, laid in the groove, and flanges $n$ compressed upon it, whereby the bail and stopper are rigidly connected. The ends of the bail $p$ pass downwardly and are formed into eyes $q$, which embrace the respective sides of the lever $h$, as shown, and are loose enough to slide freely thereon.

The stopper is loosened by throwing the lever $h$ into the position shown at Fig. 1 by the dotted lines, which forces the stopper straight upwardly by reason of the eccentricity of the lever at $i$. The stopper being thus loosened, it can be slipped along the parallel sides of lever $h$ till it is free to drop down along the same beside the bottle-neck, so as to be out of the way for pouring; or the opening may be effected by one single sweep of the lever $h$ up over the bottle and down the opposite side. The closing is effected by slipping the stopper and bail along the lever $h$ till they come over the mouth of the bottle, when a single downward pull of lever $h$ tightens and locks the stopper. The pressure upon the lever $h$ in the act of closing has a constant tendency to keep the eccentric portion $i$ in proper form for effecting a powerful closure.

The lever $h$ may be two inches long, or more, and the eccentric portion $i$ one inch long, which, with a required movement of about one-fourth of an inch for the stopper and bail, affords enormous power. Having such long leverage, a child may readily open or close the device.

The metallic cap or button $k$ has its under face concavo-conical, so that the elastic stopper $m$, in closing, is spread to great advantage with but little power.

The stopper being rigidly attached to the bail and the bail sliding at two points on the lever, the stopper must always move into proper position for closing, and need not be guided to place before closing.

The lever $h$ may be made in the form shown at Fig. 5, which is, perhaps, preferable, being more elastic and less strained in forming the curves.

Instead of forming eyes $f$ on lever $h$, the latter may be bent inwardly at the ends and pivoted in sockets in the neckband, or in eyes formed in a neckband of wire. By the above arrangement, while securing all the advantages of powerful leverage and permanent connection of the parts, I have but one pivotal point—i. e., the line passing through the point $d$.

It will be observed that the lever $h$ is not eccentric throughout, but only from about the point $i$ outwardly, the part from point $i$ toward the curve $e$ being substantially concentric with pivot $d$. Hence in locking the bail $p\ q$ rides on the inclined or eccentric part of lever $h$, growing steadily tighter till point $i$ is reached, after which further movement of lever $h$ does not either tighten or loosen the bail. The purpose of this concentric part from $i$ to $e$ is to obtain a position of stable equilibrium for the bail and avoid the disadvantage of an eccentric or recoil lock, in which the bail is carried past a center by the lever and is locked. In this recoil-lock the stopper is first drawn down tightly, and in locking is slightly released. In my concentric lock the tightening proceeds to a maximum without fall.

I claim as my invention—

1. In a bottle-stopper, the combination of a bail rigidly attached to the stopper and having eyes or slots formed on its depending ends, a neckband provided with diametrically-opposite pivotal points, and an eccentric-lever pivoted on said neckband and passing through the eyes of the bail, substantially as described.

2. In a bottle-stopper, the bail $p$, carrying rigidly the stopper $k\ m$, and having eyes $q$, in combination with the neckband $b$ and lever $h$, having eccentrics $i$ and eyes $f$, pivoted on said neckband, substantially as specified.

In testimony that I claim the foregoing as my own I have hereto affixed my signature in presence of two witnesses.

C. OTTO HAMMER.

Witnesses:
 OSWALD WERNER,
 JNO. H. BARR, Jr.